March 19, 1968 A. C. BRADHAM III 3,374,306

PRINTED CIRCUIT BOARD

Filed Sept. 12, 1966 2 Sheets-Sheet 1

Allen C. Bradham III,
Inventor.

Koenig, Senniger, Powers and Leavitt,
Attorneys.

FIG. 7.
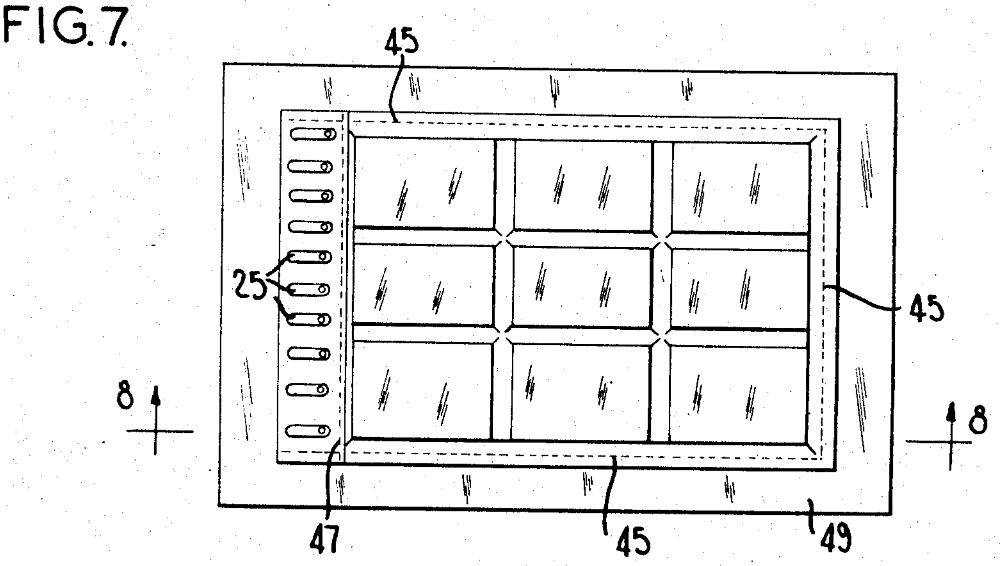
FIG. 8.
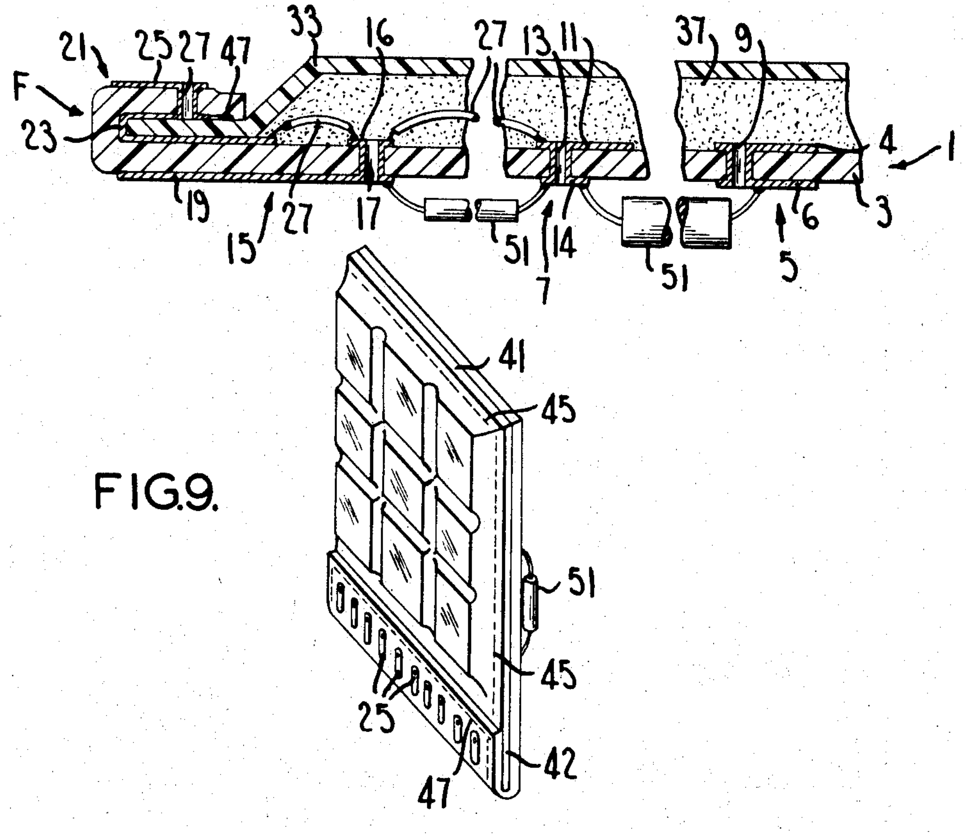
FIG. 8. FIG. 9.

United States Patent Office 3,374,306 Patented Mar. 19, 1968

3,374,306

PRINTED CIRCUIT BOARD

Allen C. Bradham III, Houston, Tex., assignor to Texas Instruments Incorporated, Dallas, Tex., a corporation of Delaware Filed Sept. 12, 1966, Ser. No. 578,647
2 Claims. (Cl. 174—68.5)

This invention relates to the manufacture of circuit boards and to the product of such manufacture.

Among the several objects of the invention may be noted the provision of a method of producing low-cost circuit boards from basic strip material, said material and the resulting boards lending themselves readily to automatic machine handling and processing; the provision of a process of manufacture of circuit boards from such basic material according to which processing time is reduced; the provision of a manufacturing process which requires only simple apparatus; and the provision of an improved moisture-tight encapsulated circuit board having satisfactory stiffness and rigidity. Other objects and features will be in part apparent and in part pointed out hereinafter.

The invention accordingly comprises the constructions, products and methods hereinafter described, the scope of the invention being indicated in the following claims.

In the accompanying drawings, in which several of various possible embodiments of the invention are illustrated, FIGURE 1 is an isometric view showing in solid lines a severed segment of a continuous basic supply strip indicated in part by dotted lines;

FIGURES 2, 3 and 4 are enlarged detail sections taken along lines 2—2, 3—3 and 4—4 of FIGURE 1 respectively;

FIGURE 7 is a plan view of a suction plate upon which the encapsulated product shown in FIGURE 6 is supported in an inverted position;

FIGURE 8 is an enlarged fragmentary cross section of a finished board after removal from a vacuum plate of FIGURE 7, being viewed on line 8—8 of FIGURE 7; and FIGURE 9 is a perspective view of a finished circuit board made according to the invention.

Corresponding reference characters indicate corresponding parts throughout the several views of the drawings. The drawings are not to scale and thicknesses of very thin parts are exaggerated for clarity of description.

Figure 1:
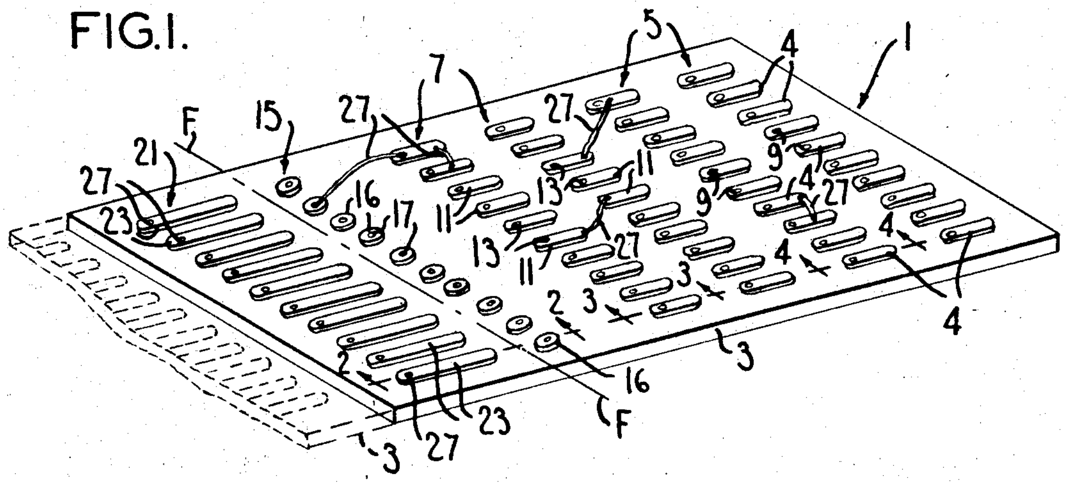
Figures 2, 4:
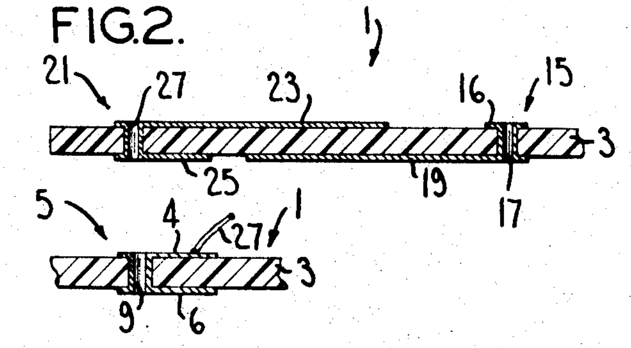
Figure 3:
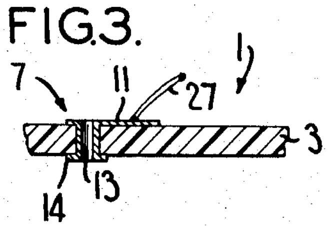

Referring now more particularly to the drawings, there is illustrated at numeral 1 a segment of a continuous flexible insulating strip illustrated in part by the dotted lines 3. The strip 3 constitutes a supply stock which may be a suitable plastic sheet such as thin Mylar, which for example, but without limitation, may be 10 mils thick. Various types of conductive pads, lugs or the like are applied to the strip 3 in repeated patterns, as illustrated in FIGURE 1. For example, numeral 5 indicates two rows of conductive devices such as shown in FIGURE 4. Each device 5 comprises thin conductive pads 4 and 6 on opposite sides of the sheet having a conductive connection 9 through a hole in the sheet 3. Numeral 7 indicates two rows of conductive members such as shown in FIGURE 3. Each of these members has a pad 11 on one side of the sheet 3 and a conductive connection 13 with a ring 14 on the other side of the sheet.

Numeral 15 also indicates a row of conductive members. Each of these members has a conductive portion 17 extending from a ring 16 through a hole in the sheet 3 and leading to a conductive strip 19 under the sheet as illustrated in FIGURE 2. Numeral 21 indicates a row of conductive members having strips 23 on top of the sheet and shorter strips 25 on the bottom of the sheet connected by conductive portions 27 through holes in the sheet. The conductors 19 and 25 form a so-called connector pattern. The conductive pad members such as 11, 14, 4, 6, 16, 19, 23 and 25 may be punched out of very thin foil and attached on the surfaces of sheet 3 in various ways, such as by pressing, heat-sealing, etching or otherwise. The through connections 9, 13, 17 and 27 are accomplished by plating through appropriately preapplied holes punched into the sheet. In view of the above it is seen that each side of each segment 1 is provided with a pattern or patterns of flat flexible conductor faces which flex with the segment.

It will be understood that a pattern such as shown in FIGURE 1 on the solid-line segment 1 is repeated on the Mylar strip which may have an indefinite length and may be wound up into a suitable supply roll (not shown). The stamped conductive parts may be composed of any desirable material such as Kovar and applied to the strip 3 in any suitable manner. Thus the supply strip carries repetitious patterns, one of which is illustrated on the solid-line segment 1. It will be understood that the number and character of patterns may be varied as desired. Since the conductive pads are very thin, as for example, a few mils, and preferably no thicker than the strip 3, flexing of the strip 3 and segment 1 is not essentially interferred with in the stage of construction illustrated in FIGURE 1. Hence the strip having on it the repeating pattern may be coiled as above stated. As an alternative, conductors constituting a pattern may be impressed through the strip as inlays so as to expose faces thereof on both sides of the strip.

After a strip such as 3 with the repeating pattern thereon has been prepared, a segment such as 1 is cut therefrom. Then prescribed wiring is suitably attached as by welding to the pads on the side of the segment shown uppermost in FIGURE 1. For reasons which will appear, this will hereafter be referred to as the inside surface of the segment. A few of such wires are indicated at 27 by way of example. The conductive members on the other side of the segment 1 (hereinafter referred to as the outside surface) which is the underside as shown in FIGURE 1 are for the later attachment of appropriate integrated circuits and other components, as will appear below.

Figure 5:
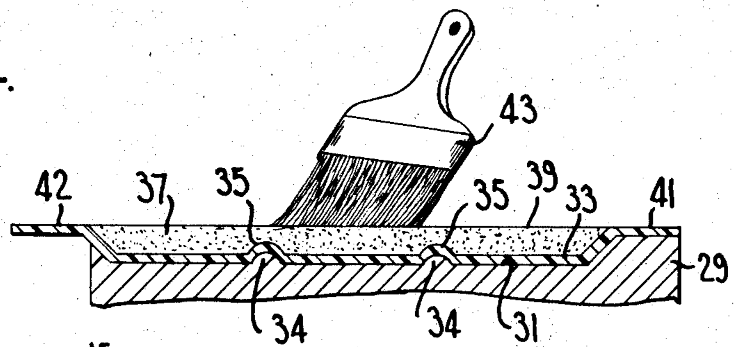
FIGURE 5 is a cross section illustrating a first encapsulating step.

Referring to FIGURE 5, there is shown at numeral 29 a rigid mold block of a molding press having an appropriately formed recess 31 for the reception of a back cover 33 which is dished. After pressing, the cover includes rib portions 35 which are made by the ribbed portions 34 of the mold block 29. The cover is made of suitable insulating plastic. Its thickness is somewhat arbitrary, as for example 10 mils, but in general it need not be made thick enough to be entirely rigid per se. The purpose of the back cover 33 is to form a pocket for the reception of an initially noncatalyzed inactive porous epoxy resin 37 of thick but flowable consistency, i.e., spongy or jelly-like. This resin is leveled with the upper surface of flanges 41 and 42 of the back cover, as indicated at 39. Next a catalyzing activator is applied to the surface 39, as by means of a brush 43. This initiates setting or solidification of the resin 37. Suitable epoxy resins and catalytic activators are known in the art.

Figure 6:
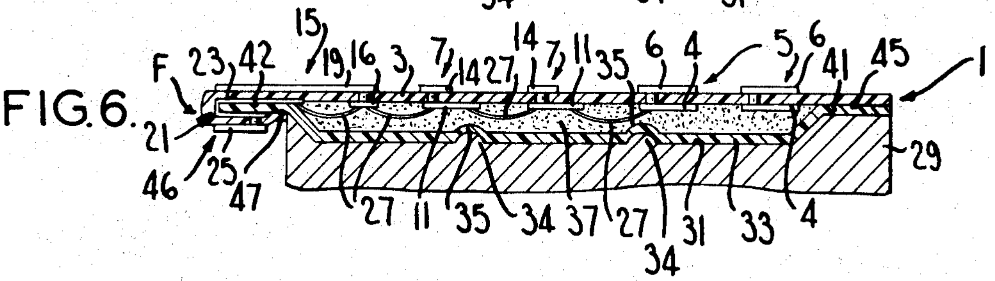
FIGURE 6 is a view similar to FIGURE 5, illustrating a subsequent encapsulating step.

Next, after turning over the top-wired segment 1, it is applied with its margins over the flanges 41 and 42. The surface pads thereon and their connected wiring 27 will thus be pushed into the initially soft mass of resin 37 in the back cover 33, as illustrated in FIGURE 6. This occurs before the activator has had time to convert the resin into the solid state. At the time that the segment 1 is inverted and applied to the resin it has an end part 46 folded on a line F—F (FIGURE 1) and under one of the flanges 42 of the back cover 33. Then the folded end part 46 is heat-sealed to the flange 42, as indicated at 47, and the remaining margins of the segment 1 are heat-sealed to the other three cover flanges, one of which is shown at 41. Since heat-sealing tools are conventional, further description is deemed to be unnecessary.

Next, while the activated resin 37 may not be completely set and solidified, the back cover 33 (with other parts assembled therewith as shown in FIGURE 6) is removed from the mold block 29. The assembly is then inverted and placed upon a conventional vacuum plate 49 (FIGURE 7) with the outside of segment 1 down. This corresponds to its underside as shown in FIGURE 1. At this time no component circuitry has been attached on this underside. The vacuum plate 49 flattens the assembly before complete curing or solidification of the epoxy resin has occurred. The assembly is left on the vacuum plate until the resin cures. As a result there is produced a rigid circuit board carrying on its outside surface conductors to which integrated circuits and other components can be welded or soldered as suggested by the illustrations of such components 51 on FIGURE 8. On the margin of this board the members 19 and 25 become terminal strips.

FIGURES 8 and 9 illustrate the finished board in its final rigid condition. Its right-hand surface (hidden in FIGURE 9) corresponds to the bottom surface on FIGURE 8. It is on this surface that the components such as 51 are attached after the board has been finished.

The brushing method illustrated in FIGURE 5 for applying the catalyzing activator to the epoxy resin is not the only method by which such application can be made. For example, this brushing step may be omitted and after the segment 1 and back cover 33 have been assembled an activator may be introduced into the resin 37 by hypodermic needle injection effected by piercing through the strip 3 or the back cover 33. Or the activator and the unactivated epoxy resin may be mixed before pouring into the back cover 33.

In view of the above, it will be seen that the board can be removed from the mold block whether or not the plastic epoxy jelly is cured. This frees the mold block for the immediate application of another back cover and work to be performed thereon. Stated otherwise, instead of using the molding block to maintain flatness during curing, the assembled board parts are removed therefrom before curing and flatness obtained in a separate step on the vacuum plate or the like.

In view of the above, it will be seen that the several objects of the invention are achieved and other advantageous results attained.

As various changes could be made in the above methods, constructions, and products without departing from the scope of the invention, it is intended that all matter contained in the above description or shown in the accompanying drawings shall be interpreted as illustrative and not in a limiting sense.

What is claimed is:

1. A circuit board comprising:
a dished back,
a substantially flat insulating sheet covering said back,
conductive elements disposed on the outside and inside surfaces of the sheet, at least some of which elements being interconnected through the sheet,
inside wiring connecting at least some of the inside conductive elements and a cured solid plastic containing said wiring and connecting the back and the sheet to form a rigid unit.

2. A circuit board made according to claim 1 having a flange around its perimeter.

No references cited.

DARRELL L. CLAY, *Primary Examiner.*